Figure 2:
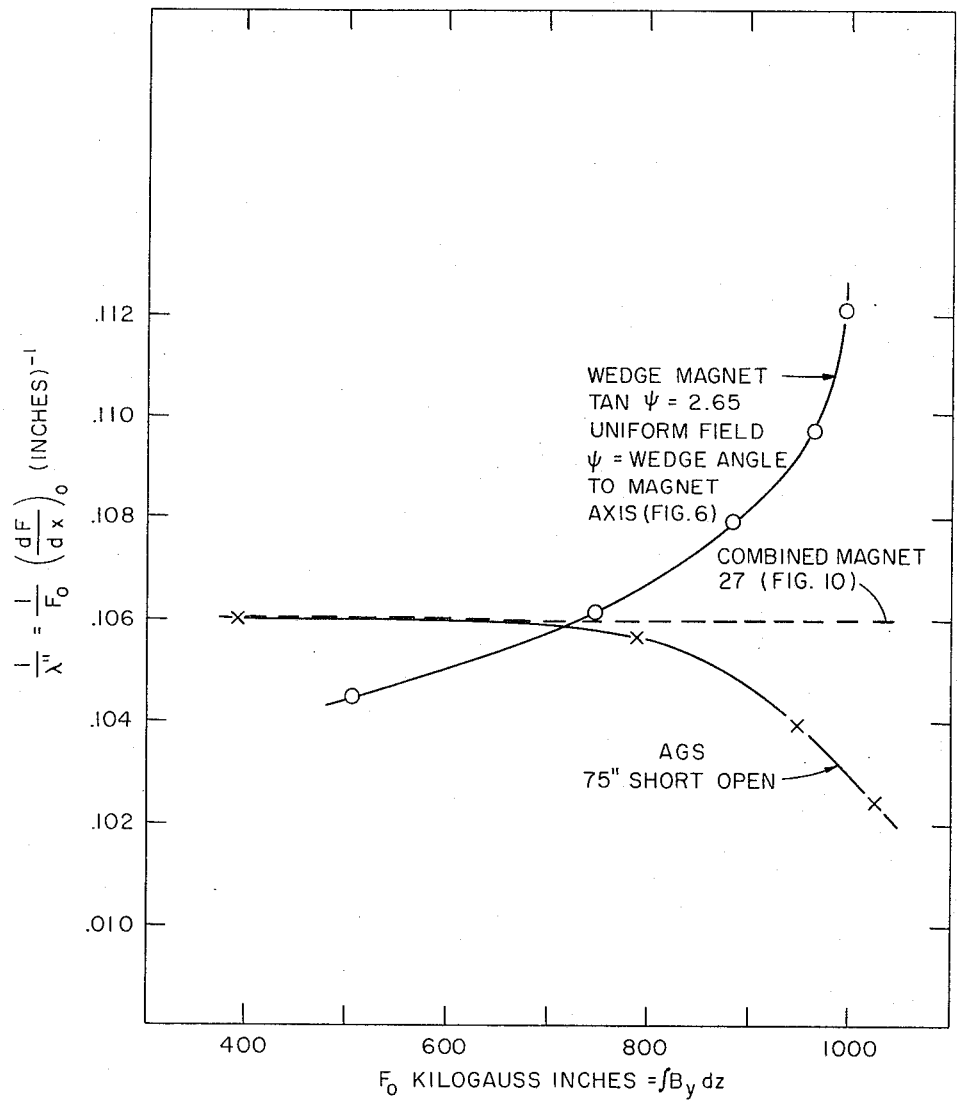

Feb. 7, 1967 R. A. BETH 3,303,426
STRONG FOCUSING OF HIGH ENERGY PARTICLES
IN A SYNCHROTRON STORAGE RING
Filed March 11, 1964 3 Sheets-Sheet 1
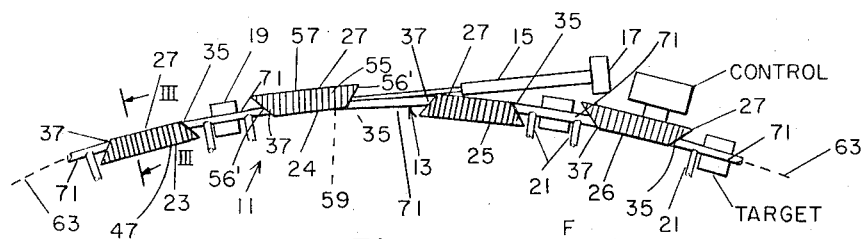
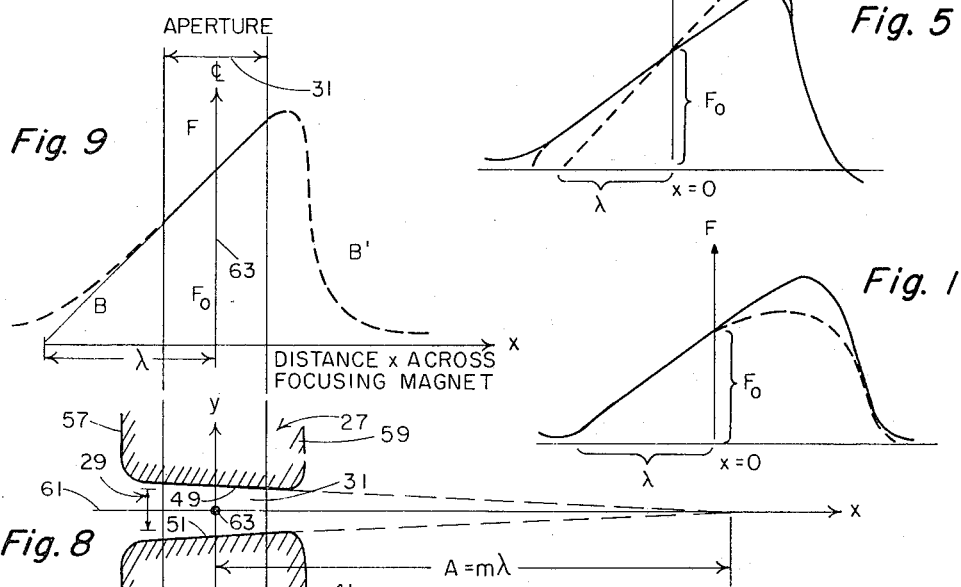
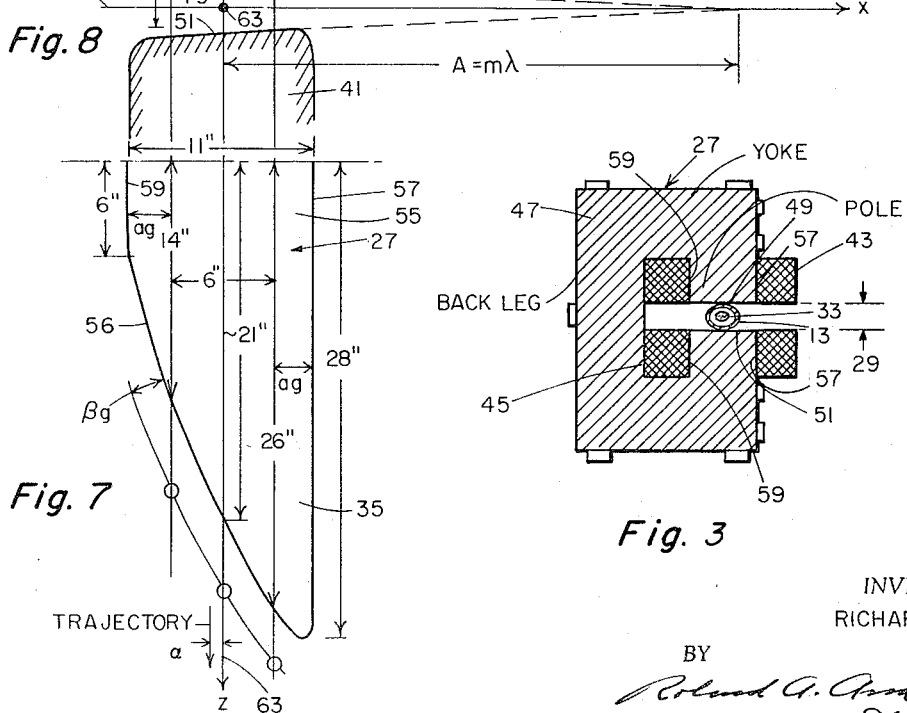
INVENTOR.
RICHARD A. BETH Feb. 7, 1967         R. A. BETH                3,303,426
     STRONG FOCUSING OF HIGH ENERGY PARTICLES
            IN A SYNCHROTRON STORAGE RING
Filed March 11, 1964                    3 Sheets-Sheet 3

INVENTOR.
RICHARD A. BETH
BY

United States Patent Office 3,303,426
Patented Feb. 7, 1967

3,303,426
STRONG FOCUSING OF HIGH ENERGY PARTICLES IN A SYNCHROTRON STORAGE RING
Richard A. Beth, Bonn, Germany, assignor to the United States of America as represented by the United States Atomic Energy Commission
Filed Mar. 11, 1964, Ser. No. 351,255
7 Claims. (Cl. 328—235)

This invention relates to high energy beams of charged particles having substantially the same momentum and to means for strong focusing and bending said beams.

In high energy physics it has been desirable to provide strong focusing of high energy beams of charged particles having substantially the same momentum. Various proposals have been made and used to this end and while these arrangements used heretofore have been useful and can accomplish strong focused proton beams, they have required the manufacture and assembly of magnets in which the magnetic fields have been limited due to the bad effects of magnetic saturation on the focusing and bending properties of the magnet. Additionally, it has been advantageous to reduce the cost of the strong focusing magnets used heretofore for bending and focusing these beams and to provide small diameter accelerator and storage rings. A storage ring is a device for containing a circulating beam for relatively long periods of time.

It is an object of this invention, therefore, to provide an improved method and apparatus for high energy beams of charged particles having substantially the same momentum.

It is another object of this invention to provide strong focusing means for high intensity, high energy beams of charged particles;

It is also an object of this invention to provide a high energy storage ring;

Another main object is to permit the use of higher magnetic fields by combating the bad effects of magnetic-saturation on focusing and bending properties of a magnet;

It is also an object of this invention to reduce the size and cost of high energy particle rings by reducing the diameter of the ring around which the beam travels;

It is also an object of this invention to provide a high intensity 33 bev. proton beam;

It is also an object of this invention to provide a 33 bev. proton beam having a diameter of .25 inch or more;

It is a further object of this invention to provide magnetic means having low weight, size and cost for high energy accelerator rings and storage rings;

It is a still further object of this invention to provide higher particle energies than have been feasible or possible heretofore in circular and colliding beams.

By this invention there is provided a method and apparatus for bending and strong focusing high intensity proton beams in the range of up to 33 bev. or more. The method and construction involved in this invention utilize standard and well known techniques and apparatus and are highly flexible for a wide range of applications, accelerators, storage rings, beam energies, particle intensities and equilibrium axes. More particularly this invention contemplates the use of a magnet having strong end focusing means. With the proper selection of magnet poles and ends as described in more detail hereinafter, it is possible by this invention to provide the desired high energy beams and magnetic bending and strong focusing fields therefor of up to over about 21 kilogauss.

Various other objects and advantages will appear from the following description of two embodiments of this invention, and the novel features will be particularly pointed out hereinafter in the appended claims.

Figure 6:
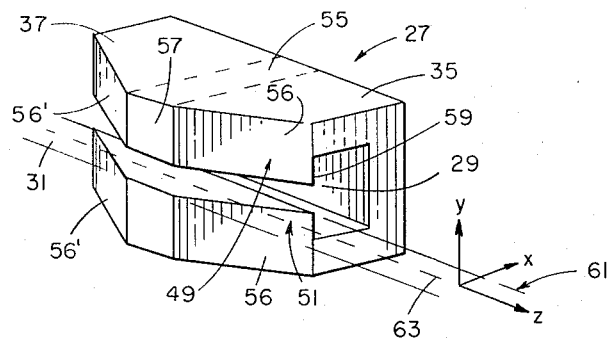
Figure 10:
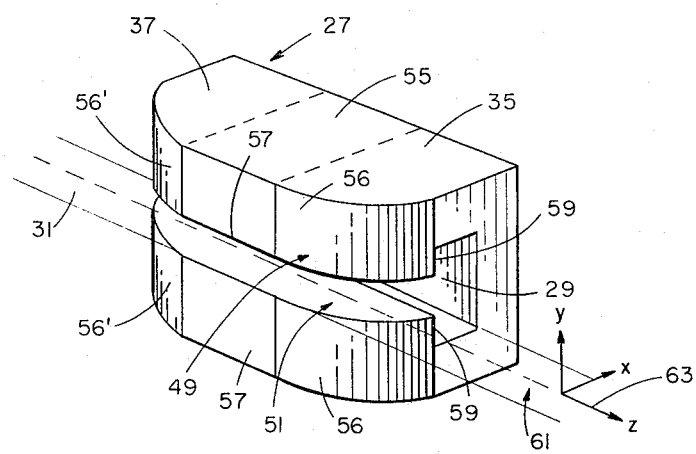

In the drawings where like parts are numbered alike:
FIG. 1 is a graphic representation of the variation of the field gradient integral (or $dF/dx$) across the aperture of a conventional rectangular strong focusing magnet with hyperbolic pole faces;
FIG. 2 is a graphic view of magnetic characteristics of strong end focusing magnets compared with conventional strong focusing magnets;
FIG. 3 is a partial cross-section of a magnet having strong end focusing in accordance with this invention;
FIG. 4 is a partial top view of the strong end focusing magnet of this invention showing a portion of the circumference of a particle confining ring therefor;
FIG. 5 is a graphic representation of the variation of the field integral F or field gradient integral across the aperture of the uniform gap magnet of FIG. 3 having straight ends slanting oppositely to each other;
FIG. 6 is a partial isometric view of the "wedge" strong end focusing magnet of FIG. 3 whose characteristics are illustrated in FIGS. 2 and 5;
FIG. 7 is a partial top view of another embodiment of the pole of the magnet of FIG. 3;
FIG. 8 is a partial cross-section of the pole of the magnet of FIG. 7;
FIG. 9 is a graphic representation of the variation of the field gradient integral (or $dF/dx$) across the aperture of the magnet of FIG. 7;
FIG. 10 is a partial isometric view of the magnet of FIG. 7;

The focusing properties of strong focusing and bending magnets depend on the way in which the field integral F varies with distance across the magnet aperture. A desired variation of F $(x)$ may be obtained in various ways. Existing strong focusing magnets, for example, utilize mainly the method in which the pole cross-section is rectangular parallel to the median plane or normal to the magnetic flux, and the required variation of F $(x)$ is obtained by giving the poles a curved profile. To make the slope or gradient of the field integral or $$dF/dx = G = \text{constant}$$

i.e, to make the rate of change in field integral across the magnet aperture a constant, the pole profile is essentially hyperbolic. The required slope is referred to hereinafter as the field gradient integral. At low fields the conventional field gradient integral is illustrated by the solid line in FIG. 1, corresponding to the flux density in gauss B across the conventional magnet aperture at a low field. Here the ordinate represents the field integral F and the abscissa represents the distance $x$ across the magnet aperture along the median plane from the beam equilibrium axis.

In practice this field gradient integral is constant over an aperture of about six inches at the low injection fields present in the Brookhaven AGS e.g. 120 gauss. At higher field e.g. at about 13,000 gauss this field integral gradient is constant over only a very short aperture such that the beam can be only up to about .25 inch wide at a full energy of 33 bev. This change in field gradient integral from low fields to high fields is illustrated by the dashed line in FIG. 1, corresponding to the flux density in gauss B' across the magnet aperture at a high field. By comparing this constant field gradient integral at the mentioned high and low fields it is seen that $B'/B$ and hence $F'/F$ tends to decrease with magnet saturation. This decrease in $B'/B$ at increasing fields in the hyperbolic pole is illustrated in FIG. 2 by the downwardly curving solid-$x$ "AGS" line. The downward slope of this line to the right shows that the field integral, i.e. how fast the field changes across the magnet aperture, tends to decrease rapidly as the field strength is increased to high fields.

It has been discovered in accordance with this invention that the constant length or rectangular shape condition in the heretofore known strong focusing magnets is arbitrary and that the desired substantially uniform saturation characteristics at high field values, e.g. over about 13 kilogauss, can be obtained by relaxing the artificial constant length and permitting either B or the magnet length or both to vary to make F the desired function of $x$ across the magnet aperture. For example, sufficient variation in $F=\int Bdz$ can be secured by shaping the ends of a C-shaped bending and focusing magnet so that the length of the trajectory lying between the iron pole varies with distance $x$ across the magnet aperture. Here $F=\int Bdz=$the field integral, $B=$the magnetic field in gauss and $z=$the distance along the beam equilibrium axis. Stated another way, the necessary variation of F with $x$ is achieved by cutting or shaping the pole ends orthogonal to the beam axis and i.e. obliquely, at a steep gradient or angle to the direction of the beam axis. This reduces or eliminates the heretofore known bad effects of saturation which tend to impair the focusing of the magnet and permits higher fields to be used.

The physical length of this tapered or shaped magnet is determined by the ratio of the needed maximum value of F divided by the maximum value of B permitted in the iron. Since the permitted B is high in this magnet, this design is shorter than the uniform length magnets known heretofore and saves up to about 10% of the iron required as well as making the diameter of the particle ring (described in more detail hereinafter) also up to about 10% smaller than was possible with the strong focusing accelerator rings known heretofore, e.g. the Brookhaven AGS evacuated particle ring. The capital cost reduction for a 33 bev. accelerator (or storage ring) can thus be up to about 3 million dollars. Similarly, large operating and maintenance cost reduction are also provided by the magnet of this invention.

A practical arrangement for accomplishing the strong end focusing of this invention, comprises a magnet 27 having electric coils 43 and 45 which surround uniform thickness, laminated iron members 47 e.g. such as the C-shaped iron member 47 shown in FIG. 3. Here the coils fill the required space between the pole legs and connecting back leg of these members 47. A suitable source (not shown) energizes these coils to generate a magnetic force with a magnetic flux acting on the particles through opposing north and south magnetic poles 49 and 51. Also, the poles are symmetrical about a median plane and have plane pole faces which permit an increase in the width of gap 29 across the magnetic aperture in which the particles are confined so as to provide for greater space available for introducing the same or larger size coils than the narrowest part of the gap in the conventional hyperbolic pole design. This wider gap 29 will also reduce the remnant field in the gap.

Since the pole faces 49 and 51 of magnets 27 are substantially planar over the major portion of their area, the construction of such magnets is easier than conventional strong focusing magnets having hyperbolic pole faces because the planar portion of the poles is much more easily cut and assembled from laminations. Also, the effective $B'/B$ can be changed easily by changing the ratio of the symmetrically shaped reduced pole width ends 35 and 37 to the uniform pole width portion 55 such as are shown in FIG. 4, e.g. more or less of uniform thickness laminations in the rectangular portion 55 having different length straight parallel edges 57 and 59 intersecting with shaped surfaces 56 and 56' of magnet end portions 35 and 37.

In operation, the net deflection angle of the particles from the entrance end to the exit end is proportional to $$\frac{F}{\text{momentum of the particles}}$$

where $F=\int Bds$, F being the transverse magnetic field integrated along the path of the particles, B being the magnetic force acting on the particles, $ds$ being the differential particle trajectory and $s$ being the particle trajectory. Here $s$ is interchangeable with $z$, the direction along the beam equilibrium axis mentioned above. The focusing characteristics of this magnet depend substantially on the functional variation of F across the aperture normal to the trajectory of the particles as provided by the oppositely directed ends 35 and 37 (FIG. 4).

Strong focusing ring 11 (partially shown in FIG. 4 for ease of explanation) has an endless evacuated tube 13 in which charged particles are injected from injector 15 having a proton source 17. Conventional radio frequency units 19 in straight sections 71 provide suitable energy or acceleration to the particles along an annular axis 63 in tube 13 (evacuated via tubes 21) in synchronization with the field strength of the magnets in ring 11. These magnets are provided in bending and focusing sectors 23, 24, 25, 26 etc. (the reverse order of the proton direction) which represent divisions of ring 11 and comprise strong focusing magnets for establishing a high energy circulating beam of strongly focused particles having a small betatron wave amplitude in tube 13. Advantageously the back leg of adjacent magnets 27 are on opposite sides of ring 11.

For providing a 33 bev. proton beam having a diameter of .25 inch the protons may be injected into evacuated tube 13 from an accelerator 15. After injection the particles may be in bunches in which case the particles may be debunched and may coast around ring 11 so as to store the particles in a beam in aperture 31 for up to from several seconds to several minutes. Equally, however, radio frequency units 16 can accelerate the particles in bunches around and around tube 13 in synchronization with the proper strong focusing field in magnets 27 from a mev. energy range to a bev. energy range e.g. to 33 bev. or even higher energies. The particles may then be debunched and circulated around ring 11 for storage.

For acceleration from low energy, the particles are injected from a low energy linac 15 while magnets 27 are at a low field, e.g. about 100–200 gauss, and radio-frequency units increase the speed of the particles in synchronization with an increasing strong focusing magnetic field in magnets 27 up to a high field or until full particle energy is reached, e.g. 33 bev. For example, a good field can be maintained across the magnet aperture even at fields of 21,500 gauss or more so as to result in considerable savings in weight and cost or reduced operation and maintenance in the magnets and strong focusing ring 11. In both storage and acceleration the field gradient integral remains uniform in azimuth around ring 11 over a reasonably wide aperture thus providing sufficiently high intensity, and sufficiently low particle loss from the beam as well as sufficiently low induced radiation from escaping beam particles. The latter results in safe and cheap operation at high energy levels.

Referring to FIG. 6, in one sequence, the protons enter and pass through the median plane 61 of each magnet 27 wherein first the particles pass through reduced width magnet end 35, having the tapered side 56 which has a straight, flat, wedge shape normal to the median plane 61 and a steep gradient to the beam equilibrium axis 63. The particles then pass through uniform length and width section 55 of magnet 27 in gap 29 and then pass through reduced width magnet end 37, having the tapered side 56' which has a straight flat wedge shape normal to the beam axis and a steep gradient to the particle direction along the beam equilibrium axis, opposite to the direction of side 56 in end 35. Upon passing through magnet 27 the particles are thus exposed to alternating end focusing i.e. focusing and defocusing so as to achieve strong focusing.

In terms of geometric optics the magnetic lenses 35 and 37 act like high field index lenses of focal length $f_1$ and $f_2$ separated by a distance $d$ and the net focal length $F$ of the combination is given by $$\frac{1}{F} = \frac{1}{f_1} + \frac{1}{f_2} - \frac{d}{f_1 f_2}$$

Also, the lenses have equal focal lengths with one converging and the other diverging, so that $f_2 = -f_1$. It follows, therefore, that $$F = \frac{f_1^2}{d}$$

whereby the focal length of the pair of lenses 35 and 37 is always positive (i.e. converging).

In this embodiment, sufficient variation in $F = \int B dz$ is secured by shaping the ends of a constant gap bending and focusing so that the length of trajectory lying between the iron pole varies with distance $x$ across the magnet aperture. The pole faces are plane and parallel and for $G$ = constant the slant of the pole ends will be essentially planes all the way through aperture 29, i.e. to make the field gradient integral or rate of change in field across the magnet aperture constant. Here the ends advantageously slant symmetrically oppositely with a uniform magnet gap. This constant field gradient integral, which is illustrated by the solid line in FIG. 5 corresponding to the flux density in gauss $B$ across the magnet aperture at a low field, is constant over a reasonably wide aperture e.g. six inches. At high fields, this integral tends to be constant over a shorter aperture because the fringing fields of the tapered ends tend to decrease with increasing field. Thus the upwardly curving dashed line in FIG. 5 shows that $F'/F_0$ tends to increase with saturation. This tendency of increase at increasing fields in $F'/F_0$ is also illustrated in FIG. 2 by the upwardly curving solid "wedge magnet line." This line shows that the field gradient integral across the aperture of this magnet 27 tends to increase rapidly at increasingly high fields.

Referring to FIG. 7, in another embodiment, having the desired variation of $F$ with $x$ across the magnet aperture, the shaping of the ends of the bending and focusing magnet 27 is accomplished by giving the sides of the magnets ends a slight curve. In this figure, one half of the magnet 27 of this embodiment is shown for ease of explanation. Here end 35 has a curving side 56 and the opposite end has an oppositely curving side. In particular, $G$ = constant can be achieved by straight but not parallel pole profiles (i.e. plane pole faces) inclined to the median plane, as shown in FIG. 8. Here the planar pole faces have a slight inclination to the median plane of only up to about 3° for effecting the magnetic field gradient integral in accordance with the curve on the sides of the strong end focusing lenses for facilitating the production of a uniform or constant field gradient integral from low to high fields in this aperture. This results in a substantially constant field gradient integral over a wide aperture at both high and low fields as shown by the curve of FIG. 9. Here the ordinate and abscissa correspond to those of the described FIGS. 1 and 5. This tendency of the field gradient integral to remain constant from low to high fields is also shown by the horizontal dashed line on the graph of FIG. 2. This feature has the advantage of providing strong focusing of wide high intensity beams from low to high energies (e.g. up to 33 bev. or higher) in acceleration and storage rings. Thus this feature has the advantage of easily providing a high intensity beam of protons of greater than .25 inch in diameter at 33 bev. and above. To this end these magnets can maintain a uniform or constant field gradient integral across a wide aperture about .25 inch wide or higher even at fields of 21,500 gauss or more, the width of this aperture being up to the distance across which this magnet provides this constant field gradient integral.

In calculating the dimensions of an example of this embodiment of magnet 27, $$F = F_0\left(1 + \frac{x}{\lambda}\right) \text{ for } -3'' \leq X \leq 3''$$

with $\lambda = 10''$ and $F_0$ = the integral at $x = 0$, so that the poles 49 and 51 of magnet 27 are shaped as inclined planes, each pole at an angle of about 3° to the median plane 61, and gap 29 height is $g = 3''$ $$\left(1 - \frac{x}{A}\right)$$

in the aperture 31.

Further, for this example, let $m = 3$ or $A = 30''$, then $g = (3 - 0.10x)$ inches over $-3'' < x < 3''$.

On the median plane 61 ($y = 0$), $B_g = B_0 g_0$ or $$B = B_0 \frac{1}{1 - \frac{x}{A}} = B_0 \frac{A}{A - x}$$

Let $Z$ = effective length of magnet $Z(x)$.
Then $F = B$, $$Z = F_0\left(1 \times \frac{x}{\lambda}\right)$$

or $$Z = \frac{F}{B} = F_0\left(1 \times \frac{x}{\lambda}\right)\frac{1}{B_0}\left(1 - \frac{x}{A}\right)$$

$$Z = \frac{F_0}{B_0}\left[1 + \left(\frac{1}{\lambda} - \frac{1}{A}\right)x - \frac{x^2}{\lambda A}\right]$$

In this example $\lambda = 10''$
$A = 30''$ $$\left[\text{Let } Z_0 = \frac{F_0}{B_0}\right]$$

$$Z = Z_0\left[1 + \frac{x}{15} - \frac{x^2}{300}\right] = \text{parabolic cylinder}$$

Thus $x = -3''$, $00''$, $3''$; $Z/Z_0 = 0.77''$, $1.00''$, $1.17''$.
If $Z_0 = 25''$, $Z = 19.25''$, $25.00''$, $29.25''$.

This gives the "effective" edge of field $\beta g$ as shown in FIG. 7. This also gives to the end of magnet 27 a parabolic curve, the curves of the spaced pole ends 35 and 37 being a section of the same convex parabolic cylinder with elements normal to the median plane.

Referring to FIG. 10, in one sequence the protons enter and pass through the median plane 61 of each magnet 27 wherein first the particles pass through reduced width magnet end 35, having a flat side 56 which curves convexly in a parabola forming a steep gradient to the beam equilibrium axis 63. The particles then pass through uniform length and width section 55 of magnet 27 in gap 29 and then pass through reduced width magnet end 37, having the shaped side 56' which has a flat curving side 56' normal to the median plane 61 and a steep gradient to the beam equilibrium axis, opposite to the direction of the side 56 of end 35. Upon passing through the magnet 27 the particles are thus exposed to alternating end focusing i.e. focusing and defocusing so as to achieve strong focusing as described above. The planes of pole faces 49 and 51 are inclined all the way through aperture 29 to effect the magnetic field integral in aperture 29 in accordance with the magnetic field produced by the strong focusing ends 35 and 37 and their sides 56 and 56' for facilitating a uniform field integral gradient in the aperture from low to high fields.

From the above it will be understood that magnets 27 may transport a beam in a wide range of energies in a ring 11 or in a beam extracted from ring 11. These beams may be collided with the other beams or a target.

The magnet of this invention reduces the effects of magnetic saturation which tend to impair the focusing properties of the magnet and reduce the usable aperture from low to high fields. This reduction in the effects of saturation permits higher fields to be used, thus tending to reduce the amount of iron in the magnet and to reduce the accelerator radius required for a given maximum energy. Also, the minimum gap between the pole faces is increased thereby permitting thicker preformed magnet coils or "pancakes" to be installed on the magnet. This wider gap also decreases the remnant field in the gap and a lower remnant field permits lower injection energies into the ring 11 for acceleration. Also, the end focusing of this invention, by reducing the distortion of field distribution caused by unequal saturation effects in the iron, permits the use of wider apertures of "good" field or the use of better more uniform fields over the present aperture. This is particularly advantageous in storage rings where wide beam diameters are advantageous in providing high beam intensity. Additionally, this invention provides a substantially uniform field gradient integral across the aperture even at high fields near saturation and this has the advantage of providing accelerators of the same or larger energy capabilities than have been known heretofore or less magnet weight and accelerator ring diameter and with corresponding reductions in construction, operation and maintenance costs.

I claim:

1. Combined strong focusing and bending apparatus for a beam of charged particles having the same momentum, comprising means consisting of a beam source, a beam container, beam acceleration means for moving said beam in said container, and a system of strong end focusing magnetic lenses defining an aperture for receiving and strong focusing said beam in said container in successive stages having edges biased obliquely to the beam trajectory, said lenses having pole faces for applying a magnetic beam bending field to said particles in the space between said pole faces for effecting the magnetic field integral in said aperture in accordance with the magnetic field produced by said strong end focusing lenses for facilitating the production of a uniform field gradient integral from low to high fields in said aperture.

2. The invention of claim 1 in which each of said magnetic lenses has oppositely inclined pole faces for facilitating the production of a uniform magnetic field gradient integral across a wide aperture from low to high fields.

3. Combined strong focusing and bending apparatus for a high intensity beam of charged particles having the same momentum, comprising means consisting of a beam source, a beam container, beam acceleration means for moving said beams in said container, a system of iron members each member having spaced planar poles with oppositely inclined pole faces having curved edges biased oppositely obliquely to the beam trajectory and which terminate in straight edges of different length for defining a gap disposed symmetrically about a median plane in said container, and coil means for producing a high magnetic flux in said iron for strong focusing said particles across a wide aperture in said container at high fields and high particle energies and intensities.

4. Alternating gradient magnetic focusing means for charged particles traveling in a column having an axis in a first plane, comprising spaced magnetic pole means disposed symmetrically about a median plane coinciding with said first plane to form a gap for receiving and transmitting said particles in said column, said magnetic pole means being shaped in planes parallel to said median plane with first and second oppositely directed ends having edges biased obliquely to the trajectory of the particles, said first ends being a section of a first convex parabolic cylinder with elements normal to said median plane and said second ends being a section of a second convex parabolic cylinder with elements normal to the median plane, said first convex parabolic cylinder section of said first ends being adapted to receive said particles with said column axis intersecting on a first bias obliquely with said first convex parabolic cylinder section in a first gradient, and means producing a magnetic field in said gap having a magnetic flux acting on said particles through said pole means along the length of the particle paths in said magnetic field for focusing said particles in said magnetic field to provide a total magnetic field effect over the length of the trajectory of said particles in said magnetic field that transmits said particles through said second convex parabolic cylinder section on a second bias oblique to said second convex parabolic cylinder section with a second gradient whereby said particles are exposed to alternating gradient magnetic focusing in passing through said pole means.

5. Combined strong focusing and bending apparatus for storing a beam of charged particles, comprising a beam source, an endless beam container, and a system of strong focusing magnets defining an aperture in a gap for receiving and strong focusing said beam in said container in successive stages, said magents having strong end focusing means forming edges biased oppositely, obliquely, steeply, to the particle trajectories for applying to said particles a uniform field integral across a wide aperture in said gap whose total effect over the length of said particle trajectories in each magnet provides the strong focusing and bending of said particles in a high intensity beam at high energies.

6. In a transport system for a beam of charged particles, said transport system employing strong focusing, with the path of said beam defining a trajectory, a strong focusing magnet comprising a plurality of iron sheets arranged to form a laminated structure having parallel spaced apart planar pole faces with the planes of said pole faces substantially equidistant from said trajectory and having edges biased obliquely to said trajectory, the dimension of each of said pole faces in the direction orthogonal to said trajectory varying with the distance along said trajectory so as to vary the effective length of said magnet in the direction of said trajectory as a function of the offset from said trajectory in the plane of said trajectory parallel to said pole faces, and electric coil means for generating a magnetic field in said magnet with a magnetic flux orthogonal to the said planes of of said pole faces.

7. Alternating gradient magnetic focusing and bending means for a high energy, high intensity beam of protons traveling with substantially the same momentum in a column having an axis in a first plane, comprising spaced magnetic pole means disposed symmetrically about said first plane to form a gap for receiving and transmitting said beam in said first plane, said magnetic pole means being trapezoidally shaped in cross-sectional planes parallel to said first plane and having first and second oppositely directed ends formed in second and third planes at right angles to said first plane and intersecting therewith in respective oppositely directed first and second lines, said second plane of said first ends being adapted to receive said beam with said beam axis intersecting on a bias obliquely with said first line in a steep gradient, and means producing a magnetic field in said gap having a magnetic flux acting on said particles through said pole means for bending said beam axis for transmitting said particles through said third plane with said beam axis intersecting on a bias obliquely with said second line in a steep gradient oppositely obliquely to the intersection of said axis and said first line so as to expose said beam particles to alternating gradient magnetic focusing with said oppositely directed first and second ends.

References Cited by the Examiner

UNITED STATES PATENTS

| | | | |
|---|---|---|---|
| 1,041,404 | 10/1953 | French | 250—41.9 |
| 2,906,954 | 9/1959 | White et al. | 324—77 |
| 2,909,688 | 10/1959 | Archard | 313—76 |
| 3,031,596 | 4/1962 | Leboutet et al. | 315—3.5 |
| 3,135,863 | 6/1964 | Hunt | 250—49.5 |

RALPH G. NILSON, *Primary Examiner.*

A. L. BIRCH, *Assistant Examiner.*